United States Patent Office 3,195,690
Patented July 20, 1965

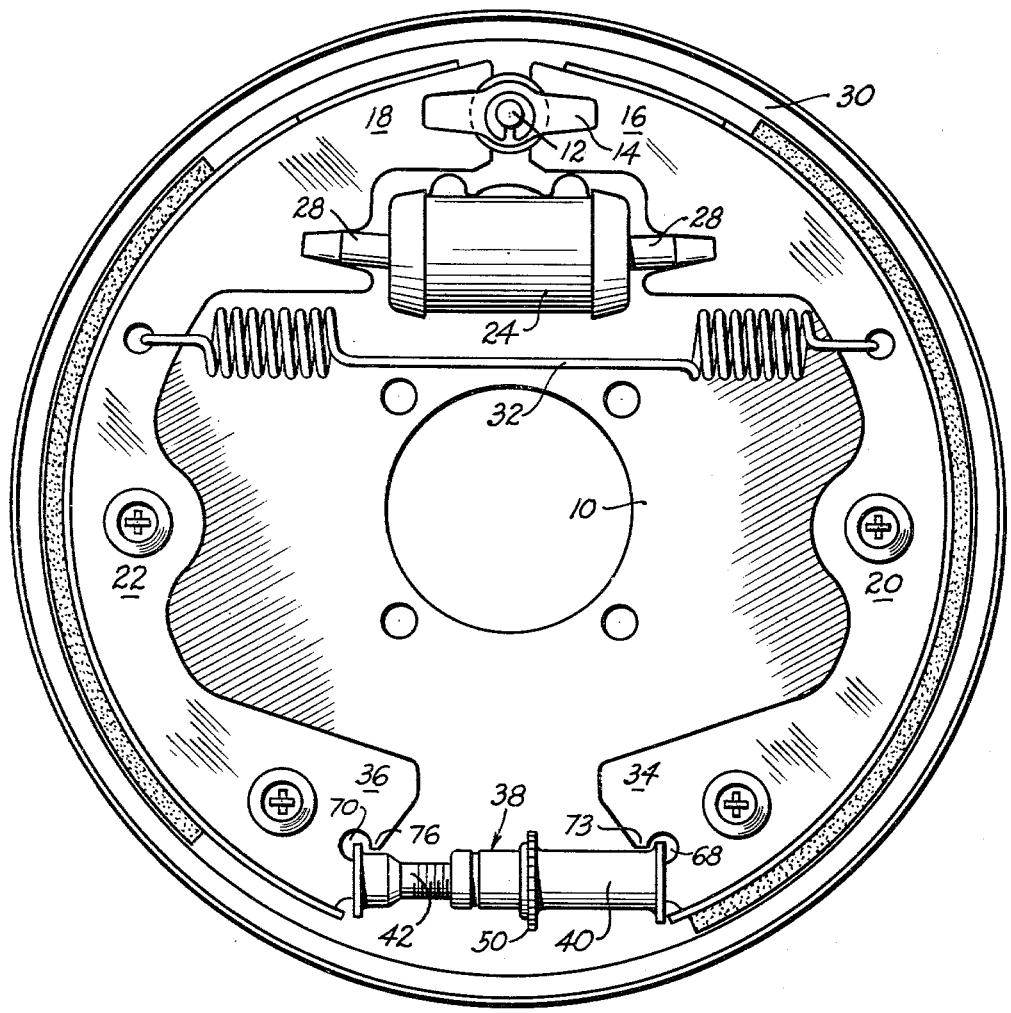
FIG_1

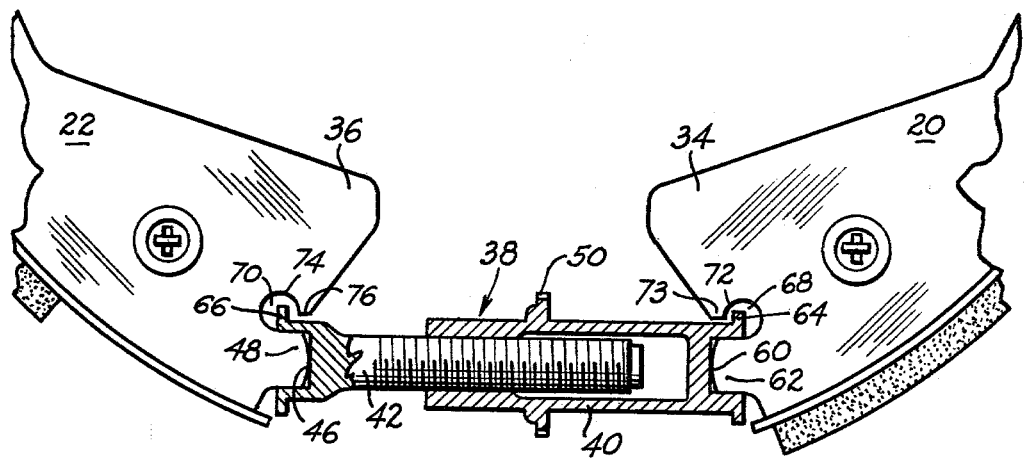
FIG_2
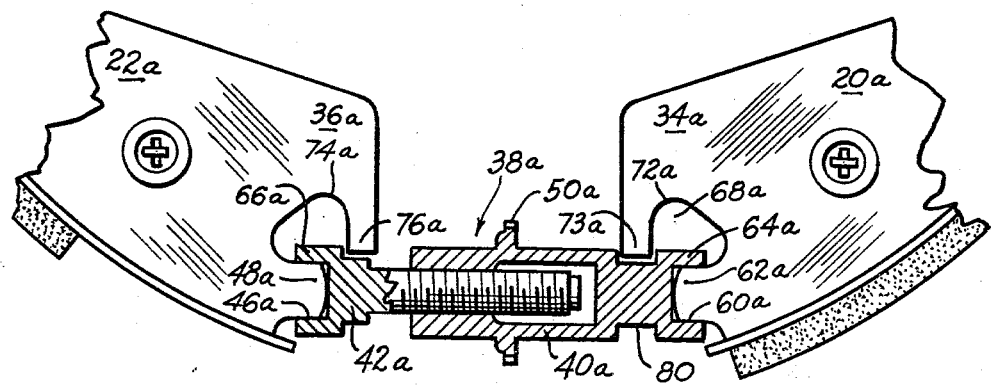
FIG_3
INVENTORS
DONALD D. JOHANNESEN.
TRAVIS G. BUDD.
EDWIN E. PRATHER.
BY- Sheldon F. Raizes
ATTORNEY.

3,195,690
ADJUSTING STRUT AND BRAKE SHOE CONNECTION
Donald D. Johannesen, Travis George Budd, and Edwin E. Prather, South Bend, Ind., assignors to The Bendix Corporation, South Bend, Ind., a corporation of Delaware
Filed Dec. 19, 1963, Ser. No. 331,770
9 Claims. (Cl. 188—79.5)

This invention relates to a connection between a strut and a brake shoe.

Ordinarily, a spring is attached to a pair of adjacent brake shoe ends interconnected by a strut for maintaining the brake shoe ends in engagement with the strut, or the strut is pinned to the brake shoe ends. Accordingly, it is an object of this invention to provide an interlocking relationship between the strut and the brake shoes wherein the spring or pins may be dispensed with.

Other objects and features of the invention will appear more fully hereinafter from a consideration of the following description, taken in connection with the accompanying drawings.

In the drawings:

FIGURE 1 is a front view of a brake assembly illustrating one embodiment of the invention;

FIGURE 2 is an enlarged partial view of the brake assembly of FIGURE 1 illustrating the FIGURE 1 embodiment of the invention in more detail; and FIGURE 3 is a partial view of a brake assembly illustrating a modified embodiment of the invention of FIGURE 1.

With reference to FIGURES 1 and 2, the brake with which the device of the invention is associated comprises a backing plate 10 mounted on an appropriate part of a vehicle such, for example, as the axle flange, not shown. Positioned on the backing plate is a fixed anchor pin 12 provided with a guide member 14 extending parallel to the backing plate for sliding engagement with the web ends 16 and 18 of shoes 20 and 22 so as to retain the adjacent shoe ends in a laterally fixed location with respect to backing plate 10. The shoe ends 16 and 18 are spread apart by a fluid motor 24 secured to the backing plate 10 by any suitable fastening means. The fluid motor includes a pair of oppositely acting pistons, not shown, operatively connected to the shoe ends 16 and 18 through force transmitting links 28. Actuation of the pistons applies a force to each of the links tending to move the shoes toward a rotatable drum 30 which may be secured to a wheel, not shown. A shoe-to-shoe spring 32 is connected at each end to a respective one of the shoes to urge the shoes into contact with the anchor 12 when the fluid motor is not pressurized.

The shoe ends 34, 36 oppositely disposed from the anchor 12 are interconnected by an adjusting strut 38. The adjusting strut comprises an adjusting screw 42 and an adjusting screw nut 40 which are relatively rotatable. The adjusting screw 42 is provided with a threaded stem and a rectangularly shaped slot 46 into which a projection 48 of shoe end 36 extends thereby providing a non-rotatable fit between the screw 42 and the shoe 22. One end of the adjusting screw nut 40 is provided with a threaded tubular portion to receive the stem of the adjusting screw 42 and the other end of the adjusting screw nut 40 is provided with a round opening 60 to receive a projection 62 of shoe end 36 thereby providing a rotatable connection between the screw nut 40 and the shoe 20. The adjusting screw nut 40 is further equipped with a serrated or toothed wheel 50 for rotating the adjusting screw nut when adjustment is required. The serrations are either engaged by a tool which is inserted through an opening in the backing plate (not shown) for manual adjustment or may be engaged by a lever of any well known automatic adjuster.

An annular flange 64 is provided on the adjusting screw nut 40 and an annular flange 66 is provided on the adjusting screw 42. The flange 64 extends into an opening 68 of the web of the brake shoe 20 and the flange 66 extends into an opening 70 of the web of the brake shoe 22. The edge 72 of the opening 68 is discontinuous and terminates at spaced ends, one of which is located at the projection 62 and the other of which is designated by reference numeral 73. The edge 74 of the opening 70 is also discontinuous and terminates at spaced ends, one of which is located at the projection 48 and the other of which is designated by reference numeral 76. These spaced ends provide entrances to the openings for the flanges 64 and 66. The ends 73 and 76 are so located to retain the flanges 64 and 66 within their respective openings thereby forming an interlock between the adjusting strut 38 and the ends of the brake shoes 20 and 22.

To assemble the strut to the brake shoes, each shoe is tilted relative to the strut to place the flange within its respective opening and then its respective projection 62 or 48 is brought within the recess 60 or 46. It can be seen from the interlocking relationship that any forces tending to separate the shoe ends from each other, and thus from the adjusting strut, will effect engagement of the flanges 64 and 66 with the ends 73 and 76, respectively, to prevent disengagement of the adjusting strut 38 from either of the brake shoes. Disassembly can be accomplished only by a procedure reverse to assembly.

Referring to FIGURE 3, a modified version is shown with those elements which are similar to those of the embodiment of FIGURE 1 being shown with the same reference numerals with a small "a" affixed thereto. The adjusting nut 40a has a groove 80 in the body thereof forming a flange 64a at one end of the body of the nut and extends into the opening 68a of the brake shoe 20a. The adjusting screw 42a has a flange 66a extending into the opening 70a of the web of the brake shoe 22a. One of the ends, 73a, of the edge 72a of the opening 68a extends within the groove 80 to form an interlock between the brake shoe 20a and the adjusting screw nut 40a and one of the ends 76a of the edge 74a of the opening 70a is positioned to retain the flange 66a within its respective opening. Thus, an interlock is formed between the adjusting strut 38a and the brake shoes 20a and 22a.

Although this invention has been illustrated and described in connection with specific embodiments, numerous other adaptations of the invention will become apparent to those skilled in the art. We intend to include within the scope of the following claims all equivalent applications of the invention whereby the same or substantially the same results may be obtained.

We claim:

1. In a brake, a pair of brake shoes arranged in end to end relationship, a strut between one pair of adjacent shoe ends, means operatively connecting one of the ends of said strut to one of said shoe ends, the other of said shoe ends and the other end of said strut having cooperating abutting surfaces, said other shoe end having an opening therein, the edge of said opening being discontinuous to define two spaced ends of said edge, said other end of said strut having a portion extending between the ends of and into said opening, one of the ends of said opening terminating at a location between said portion of said strut and said one shoe end for retaining said portion within said opening whereby an interlock between said other shoe end and said strut is effected.

2. The structure as recited in claim 1, wherein said portion on said strut is an annular flange.

3. In a brake, a pair of brake shoes arranged in end to end relationship, a strut between one pair of adjacent shoe ends, said shoe ends and said strut having cooperating abutting surfaces, each of said shoe ends having an opening therein, the edge of each of said openings being discontinuous to define two spaced ends of said edge, said strut having portions extending between the ends of and into a respective one of said openings, one of the ends of each of said openings terminating at a location between its respective said portion of said strut and the other of said shoes for retaining its respective said portion within said opening whereby an interlock between said shoes and said strut is effected.

4. The structure as recited in claim 3 wherein said portions on said strut are annular flanges.

5. In a brake, a pair of brake shoes arranged in end to end relationship, a strut between one pair of adjacent shoe ends, said shoe ends and said strut having cooperating abutting surfaces, each of said shoe ends having an opening therein, the edge of each of said openings being discontinuous to define two spaced ends of said edge, an annular groove in the outer surface of said strut spaced from one end thereof to define an annular flange at said one end extending between the ends of and into a respective one of said openings, a flange at the other end of said strut extending between the ends of and into the other of said openings, one of the ends of said one opening terminating at a location within said groove, one of the ends of said other opening terminating at a location between its respective flange and the other of said shoes for retaining its respective flange within its respective opening, whereby an interlock is effected between said shoes and said strut.

6. In a brake, a pair of T-shaped in cross section brake shoes arranged in end to end relationship, each of said brake shoes comprising an arcuate web with a transverse arcuate rim secured thereto and friction material secured to said rim, a strut extending between a pair of adjacent ends of said web, means operatively connecting one end of said strut to the web of one of said shoes, said end of said web of the other of said shoes having a projection and an opening immediately adjacent said projection, a portion of the edge of said opening and a portion of the edge of said projection being common to each other, the edge of said opening being discontinuous to define two spaced ends of said edge, said common edge portion terminating at one of said spaced ends of said opening edge, said strut having a recess at its other end receiving said projection therein, an annular flange at said other end of said strut extending into said opening, the other of said ends of said edge of said opening terminating at a location between said flange and said one shoe for retaining said flange within said opening whereby an interlock between said other shoe and said strut is effected.

7. In a brake, a pair of T-shaped in cross section brake shoes arranged in end to end relationship, each of said brake shoes comprising an arcuate web with a transverse arcuate rim secured thereto and friction material secured to said rim, a strut extending between a pair of adjacent ends of said web, each of said adjacent ends of said webs having a projection and an opening immediately adjacent said projection, a portion of the edge of said opening and a portion of the edge of said projection being common to each other, the edge of said opening being discontinuous to define two spaced ends of said edge, said common edge portion terminating at one of said spaced ends of said opening edge, said strut having a recess at each end receiving a respective one of said projections therein, an annular flange at each end of said strut extending into a respective one of said openings, the other of said ends of each of said edges of said openings terminating at a location between its respective flange and the other of said shoes for retaining said flange within said opening whereby an interlock between said shoes and said strut is effected.

8. In a brake, a pair of T-shaped, in cross section, brake shoes arranged in end to end relationship, each of said brake shoes comprising an arcuate web with a transverse arcuate rim secured thereto and friction material secured to said rim, a strut extending between a pair of adjacent ends of said web, each of said adjacent ends of said webs having a projection and an opening immediately adjacent said projection, a portion of the edge of said opening and a portion of the edge of said projection being common to each other, the edge of said opening being discontinuous to define two spaced ends of said edge, said common edge portion terminating at one of said spaced ends of said opening edge, said strut having a recess at each end receiving a respective one of said projections therein, an annular groove in the outer surface of said strut spaced from one end thereof to define an annular flange at said one end of said strut, said annular flange extending into one of said openings, an anular flange at the other end of said strut extending into the other of said openings, the other end of said edge of said one opening extending within said groove for retaining its respective flange within said one opening, the other end of said edge of said other opening terminating at a location between its respective flange and the other of said shoes for retaining said flange within said other opening whereby an interlock between said shoes and said strut is effected.

9. In a brake, a pair of brake shoes arranged in end to end relationship, a strut between one pair of adjacent shoe ends, one of said shoe ends and one of the ends of said strut having cooperating abutting surfaces, one of said one ends having an opening therein, the other of said one ends having a portion fixed thereto and projecting into said opening, a portion of said one end which defines said opening embracing said projecting portion and arranged relative thereto to form an interlock therebetween and retain such projecting portion in said opening and thereby secure said one end of said strut to said one end of one of said shoes, and means operatively connecting the other end of said strut to the other of said ends on the other shoe.

References Cited by the Examiner

UNITED STATES PATENTS 2,536,410 1/51 Anderson _____ 188—79.5
2,777,542 1/57 Russell _____ 188—79.5 X ARTHUR L. LA POINT, *Primary Examiner.*
DUANE A. REGER, *Examiner.*